US012794976B2

(12) United States Patent
Wyatt et al.

(10) Patent No.: US 12,794,976 B2

(45) Date of Patent: Nov. 10, 2026

(54) DELEGATED SERVICES PLATFORM SYSTEM AND METHOD

(71) Applicant: Pavlov Media, Inc., Champaign, IL (US)

(72) Inventors: Bartow Wyatt, Champaign, IL (US); Craig Sellars, Roswell, GA (US)

(73) Assignee: Pavlov Media, Inc., Champaign, IL (US)

( * ) Notice: Subject to any disclaimer, the term of this patent is extended or adjusted under 35 U.S.C. 154(b) by 343 days.

(21) Appl. No.: 17/202,017

(22) Filed: Mar. 15, 2021

(65) Prior Publication Data

US 2021/0203717 A1 Jul. 1, 2021

Related U.S. Application Data

(60) Division of application No. 14/206,952, filed on Mar. 12, 2014, now Pat. No. 10,951,688, and a continuation-in-part of application No. 17/157,817, filed on Jan. 25, 2021, now abandoned, and a continuation-in-part of application No. 16/827,308, (Continued)

(51) Int. Cl.

| | |
|---|---|
| ***H04L 67/1097*** | (2022.01) |
| ***G06F 16/901*** | (2019.01) |
| ***H04L 61/4511*** | (2022.01) |
| ***H04L 61/58*** | (2022.01) |
| ***H04L 67/1001*** | (2022.01) |

(Continued)

(52) U.S. Cl.

CPC ...... *H04L 67/1097* (2013.01); *G06F 16/9027* (2019.01); *H04L 61/4511* (2022.05); *H04L 61/58* (2022.05); *H04L 67/1001* (2022.05); *H04L 67/568* (2022.05); *H04L 67/59* (2022.05)

(58) Field of Classification Search

None

See application file for complete search history.

(56) References Cited

U.S. PATENT DOCUMENTS 6,192,398 B1 2/2001 Hunt
6,275,496 B1 8/2001 Burns (Continued)

OTHER PUBLICATIONS

Cisco ("Cisco IOS Server Load Balancing Configuration Guide," Mar. 23, 2011 (Year: 2011).*

*Primary Examiner* — Yu Zhao

(74) *Attorney, Agent, or Firm* — James E. Eakin

(57) ABSTRACT

System and method for delegating to a local appliance some or all tasks traditionally performed by a central service endpoint in responding to a request from an end-consumer for content, an application, or a service. The local appliance is typically a computer server with associated local storage. Local appliances capable of providing the requested content, application or service, and also handling any security protocols or similar specialized requirements, are identified and selected to service the end-consumer's request, while the central service point retains overall management of the process and can, if appropriate, resume handling of the request in a manner that is substantially seamless to the end-consumer. Other capable local appliances can also be identified, based on network performance criteria, and re-delegation can occur to support movement of mobile devices or other network conditions.

5 Claims, 8 Drawing Sheets

Related U.S. Application Data filed on Mar. 23, 2020, now Pat. No. 11,089,129, which is a division of application No. 14/192,292, filed on Feb. 27, 2014, now Pat. No. 10,601,943, and a continuation-in-part of application No. 14/192,378, filed on Feb. 27, 2014, now Pat. No. 10,264,090, application No. 17/202,017, filed on Mar. 15, 2021 is a continuation-in-part of application No. 14/192,320, filed on Feb. 27, 2014, now Pat. No. 12,348,596, and a continuation-in-part of application No. 16/806,909, filed on Mar. 2, 2020, now Pat. No. 12,627,747, which is a division of application No. 14/192,355, filed on Feb. 27, 2014, now Pat. No. 10,581,996.

(60) Provisional application No. 61/770,211, filed on Feb. 27, 2013.

(51) Int. Cl.
*H04L 67/568* (2022.01)
*H04L 67/59* (2022.01)

(56) References Cited

U.S. PATENT DOCUMENTS

| | | | | |
|---|---|---|---|---|
| 6,415,323 | B1 * | 7/2002 | McCanne | H04L 12/18 709/224 |
| 7,565,494 | B1 | 7/2009 | Todd | |
| 8,370,460 | B1 | 2/2013 | Khakpour | |
| 8,615,577 | B2 | 12/2013 | Black | |
| 9,582,603 | B1 | 2/2017 | Archarya | |
| 10,261,938 | B1 | 4/2019 | Jenkins | |
| 10,601,943 | B2 | 3/2020 | Wyatt | |
| 10,904,333 | B2 | 1/2021 | Wyatt | |
| 2002/0019990 | A1 | 2/2002 | Sincaglia | |
| 2002/0143798 | A1 | 10/2002 | Lisiecki | |
| 2002/0198937 | A1 * | 12/2002 | Diwan | H04L 67/1001 709/227 |
| 2003/0236837 | A1 | 12/2003 | Johnson | |
| 2004/0098625 | A1 | 5/2004 | Lagadec | |
| 2006/0268759 | A1 | 11/2006 | Emery | |
| 2007/0070066 | A1 | 3/2007 | Bakhash | |
| 2008/0060013 | A1 | 3/2008 | Sarukkai | |
| 2008/0154879 | A1 | 6/2008 | Lin | |
| 2008/0306871 | A1 | 12/2008 | Grannan | |
| 2009/0119087 | A1 * | 5/2009 | Ang | G06F 9/45558 703/23 |
| 2009/0198997 | A1 | 8/2009 | Yeap | |
| 2009/0234968 | A1 | 9/2009 | Thomas | |
| 2009/0276771 | A1 | 11/2009 | Nickolov | |
| 2010/0036954 | A1 | 2/2010 | Sakata | |
| 2010/0094878 | A1 | 4/2010 | Soroca | |
| 2010/0205292 | A1 | 8/2010 | Diaz | |
| 2010/0214921 | A1 * | 8/2010 | Sau | H04L 47/263 370/232 |
| 2010/0223364 | A1 * | 9/2010 | Wei | H04L 67/1097 718/1 |
| 2011/0040826 | A1 | 2/2011 | Chadzelek | |
| 2011/0099226 | A1 | 4/2011 | Liu | |
| 2011/0126230 | A1 | 5/2011 | Dow | |
| 2011/0131341 | A1 | 6/2011 | Yoo | |
| 2011/0257049 | A1 | 10/2011 | Ramer | |
| 2011/0264649 | A1 | 10/2011 | Hsiao | |
| 2011/0270964 | A1 | 11/2011 | Huang | |
| 2012/0017050 | A1 | 1/2012 | Kraiman | |
| 2012/0109902 | A1 | 5/2012 | Rozensztejn | |
| 2012/0137336 | A1 | 5/2012 | Applegate | |
| 2012/0144117 | A1 | 6/2012 | Weare | |
| 2012/0159558 | A1 | 6/2012 | Whyte | |
| 2012/0198075 | A1 | 8/2012 | Crowe | |
| 2013/0145001 | A1 | 6/2013 | Qian | |
| 2013/0159383 | A1 | 6/2013 | Tuliani | |
| 2013/0159473 | A1 | 6/2013 | Newton | |
| 2013/0204961 | A1 | 8/2013 | Fliam | |
| 2014/0108958 | A1 | 4/2014 | Toepper | |
| 2014/0314412 | A1 | 10/2014 | Soto | |
| 2015/0019714 | A1 | 1/2015 | Shaashua | |
| 2015/0084416 | A1 | 3/2015 | Nishibayashi | |
| 2015/0088492 | A1 | 3/2015 | Liu | |
| 2017/0201571 | A1 | 7/2017 | Sherf | |
| 2019/0124425 | A1 | 4/2019 | Elford | |
| 2021/0309425 | A1 | 10/2021 | Hiltser | |

* cited by examiner

DELEGATED SERVICES PLATFORM SYSTEM AND METHOD

RELATED APPLICATIONS

This application is a divisional application of U.S. patent application Ser. No. 14/206,952, filed Mar. 12, 2014, now U.S. Pat. No. 10,951,688, which in turn is a conversion of U.S. Patent Application Ser. No. 61/777,908 filed Mar. 12, 2013 and which further is a continuation-in-part of each of the following applications:

Ser. No. 14/213,179, filed Mar. 14, 2014,
Ser. No. 14/192,378, filed Feb. 27, 2014,
Ser. No. 14/192,355, filed Feb. 27, 2014,
Ser. No. 14/192,320, filed Feb. 27, 2014,
Ser. No. 14/192,292, filed Feb. 27, 2014,
each of which in turn claims priority from each of the following provisional patent applications:
Ser. No. 61/790,474, filed Mar. 15, 2013,
Ser. No. 61/777,908, filed Mar. 12, 2013
Ser. No. 61/770,163, filed Feb. 27, 2013,
Ser. No. 61/770,186, filed Feb. 27, 2013,
Ser. No. 61/770,204, filed Feb. 27, 2013,
Ser. No. 61/770,211, filed Feb. 27, 2013,
all of which are incorporated herein by reference as though set forth in full.

FIELD OF THE INVENTION

The present invention relates generally to internet application service systems and methods and, more particularly, relates to methods, systems and techniques for providing improved network applications and services by delegating at least some functions to a third party located at a privileged or advantageous point on the network, for example, on the same high capacity low latency local network as the consumer.

BACKGROUND OF THE INVENTION

On-demand Internet delivery of applications, services and digital content allows consumers the ability to experience technology without the need to maintain and carry fully capable and therefore expensive devices on their person at all times. However, consumption of these applications and services over the Internet can lead to degraded performance due to insufficient bandwidth and/or perceivable latency between the consumer interaction—e.g., a request for content, or an application—and the eventual software processing that causes that request to be displayed on the user's computer screen. These two limitations, when unmitigated, can negatively impact a consumer's experience to the point where these applications and services are not viable.

Presently, Internet-delivered applications and services are typically connected point-to-point: a consumer device will connect, through the internet, to a remote service endpoint and data will be exchanged directly between these two locations via the Internet. The closer these two parties are to one another, the lower the latency will be and the more responsive the consumer experience will appear. While proximity does not necessarily ensure high bandwidth capacity, it is usually associated with higher capacity links and it removes or minimizes the negative effects of adverse conditions on the individual networks which may transport the data. For example, a consumer home network may have a 100 megabit or 1 gigabit capacity. However their cable broadband connection may only have a 25 megabit capacity, and further may suffer congestion due to a larger pool of consumers sharing the network. To the consumer, this appears as a poorly-performing 25 megabit connection for any content, application or service not on their home network. Therefore, it is desirable from a consumer's perspective to have local application and service endpoints.

Conversely, maintaining service endpoints local to end consumers is not desirable from a commercial entity's perspective as it requires more deployed service endpoints and more expensive local hosting arrangements. Industry demands for cost-reduction have forced a consolidation of service endpoints into more efficient server co-location facilities where processing power and network connectivity can be aggregated. These colocation facilities are rarely, if ever, directly attached to end-consumer local networks.

Furthermore, as consumer devices become increasingly mobile, a given end-consumer's local network can change during the course of even a simple interaction between the end-consumer and an Internet-delivered application. This presents further complication to deploying a service endpoint at or near the local edge of an end-consumer's network: if a service endpoint is deployed too proximate to an end-consumer, it is at risk of becoming less desirable than a centralized service endpoint if the end-consumer migrates to a different local network.

As a result, there is a great need for a system which can allow for cost-effective centralization of service endpoints, while also providing the localized performance of a service endpoint deployed proximate to the end-consumers' local network while still being tolerant of changing network conditions including but not limited to device mobility.

SUMMARY OF THE INVENTION

The present invention provides an efficient system and method for delegating, in a manner transparent to the end-consumer, the fulfillment of part or all of an internet-delivered application or service, or dependency thereof, to a delegation appliance or similar device which exists in a more advantageous position for performing that fulfillment. In an embodiment, the delegation appliance is directly attached to an end-consumer's local network, while remaining tolerant and adaptive to network conditions such as device mobility.

In an aspect of the invention, the system comprises a processing appliance together with associated storage deployed proximate to, or within, an end-consumer's local network. In an embodiment, this local appliance communicates directly with consumer devices over a high capacity low latency local network, and also communicates with a central service endpoint over the Internet. The local appliance comprises functionality for emulating exactly the communication from a central service endpoint to the end-consumer, given identification and service metadata from a cooperating central service endpoint.

The central service endpoint comprises the necessary components to provide a particular service and, additionally, comprises functionality for identifying local appliances positioned to better service a given end-consumer and for delegating aspects of its service to such a local appliance. The central service endpoint coordinates with one or more local appliances by providing proper identification and service metadata to the local appliances, as well as providing any necessary feedback that the central service endpoint receives from the end-consumer device.

In an embodiment, the process by which the central service endpoint and the local appliance coordinate delivery of a service guarantees at all times that the central service endpoint can reclaim service processing. This process ensures survivability of the end-consumer experience in the event of a failure of the local appliance or in cases where an alternate local appliance exists that becomes better positioned to service an end-consumer, such as might occur due to network conditions including but not limited to end-consumer device mobility.

One of many possible examples which utilize this aspect is that of an accelerated content delivery service which provides the end consumer high capacity and low latency access to digital content while allowing the management of that content and specialized request processing, such as enforcing access restrictions or producing end consumer specific decryption keys, to remain efficiently centralized at the central service endpoint. In an embodiment, upon identifying a local appliance which maintains a copy of the digital content that the central service endpoint is requested to produce, the central service endpoint sends metadata to the local appliance comprising the description of the digital content as well as information necessary to emulate the transmissions of the central service endpoint completely. The local appliance can then supplant the central service endpoint as the producer of the desired content by creating a data stream that appears to originate from the central service endpoint when received by an end-consumer device but which exists only on the end-consumer's local network. Upon complete reception of the digital content, the consumer device will have informed the central service endpoint of delivery and the central service endpoint will have, in turn, informed the local appliance. If a local appliance should fail or become otherwise incapable or inefficient, the central service endpoint can take over and/or re-delegate to another local appliance. In at least some embodiments, that take-over or re-delegation is seamless to the end-consumer.

It is therefore one object of the present invention to provide an appliance which can perform aspects of a given internet-delivered application or service with a vastly improved end-consumer experience and/or at a substantially reduced cost to the provider.

It is a further object of the present invention to provide a system for identifying and effectively utilizing such appliances so that central service endpoints can make real time adaptations and decisions regarding delegation, performance and content of the service as a whole.

It is a further object of the present invention to provide a system for coordinating service between a local appliance and an end-consumer device by way of a central service endpoint that can adapt elegantly to changes in network conditions including but not limited to end-consumer device mobility.

These and other objects of the present invention will be apparent from the following detailed description, taken together with the appended figures.

THE FIGURES

DETAILED DESCRIPTION OF THE INVENTION

Figure 1:
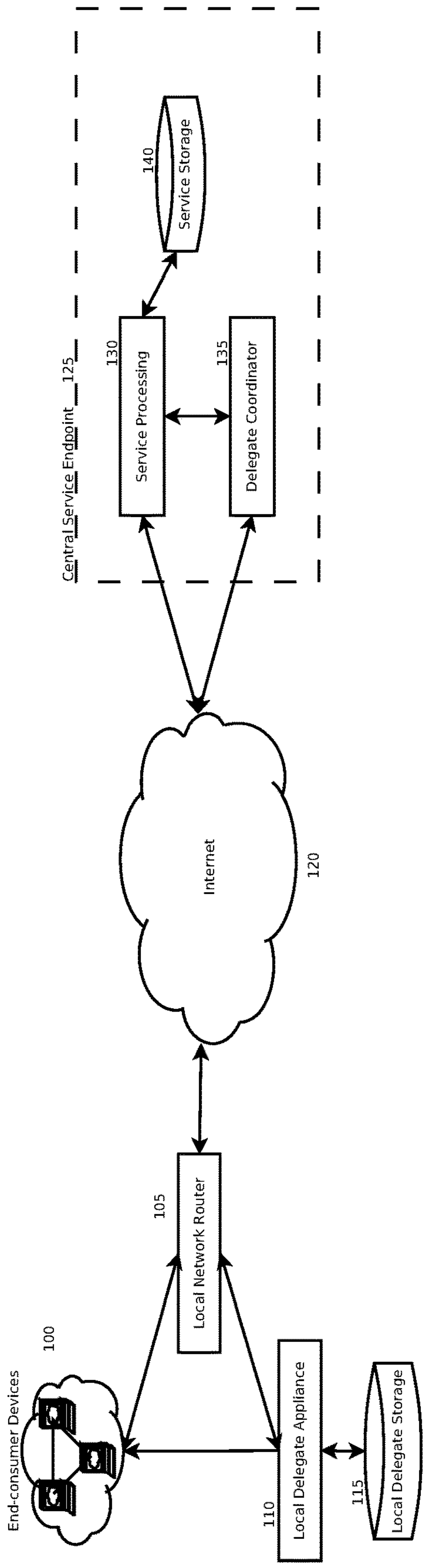
FIG. 1 shows a basic arrangement for practicing an embodiment of one method in accordance with the present invention.

Referring to FIG. 1, a group of one or more End-Consumer Devices 100 is directly connected to a Local Network Router 105 and a Local Delegate Appliance 110. In at least some embodiments, the End-Consumer Devices 100 can be any device capable of interacting with the Internet, such as laptop computers, desktop computers, smartphones, gaming consoles, etc. The Local Delegate Appliance 110 can be, in at least some embodiments, a computer server or other device capable of performing services which are delegated to it and reproducing data on a network to appear as if it originated from another network-connected device. In addition, the Local Delegate Appliance 110 is, in at least some embodiments, directly attached to Local Delegate Storage 115 which may be useful for fulfilling services delegated to the appliance.

Both the End-Consumer Devices 100 and Local Delegate Storage access the Internet 120 by way of the Local Network Router 105. The Internet 120 provides connectivity with a Central Service Endpoint 125 comprising a Service Processor 130, a Delegate Coordinator 135 and, in at least some embodiments, Service Storage 140. The Service Processor 130 is, in at least some embodiments, a computer server or other device capable of performing the desired service utilizing the Service Storage 140 when appropriate. The Delegate Coordinator 135 is, in some embodiments, an independent computer server operating in parallel with the Service Processor 130 for communicating with and coordinating Local Delegate Appliances 110. Alternatively, the Delegate Coordinator 135 can be a software module operating on Service Processor 130 in parallel with a service processing module or other construct, which cooperates to communicate with and coordinate Local Delegate Appliances 110. The role of the Delegate Coordinator 135 is to abstract the control of a plurality of Local Delegate Appliances 110 from the service itself. This presents a convenient point of interaction between a service maintained by an independent commercial or private entity and the particular implementation of the systems and methods of the present invention.

In a typical embodiment of the system, an End-Consumer Device 100 will contact a Central Service Endpoint 125, for example a web server, via the Local Network Router 105 and Internet 120, respectively, and request a service, such as the delivery of a desired web video. The Central Service Endpoint 125 can choose to deliver the service response, typically a web video in this example. Traditionally, that is done by retrieving it from the Service Storage 140 and transmitting it via the Internet 120 and Local Network Router 105 to the End-consumer device 100.

Alternatively, and in accordance with an embodiment of the present invention, the Central Service Endpoint 125 can offload the fulfillment of the request to the Delegate Coordinator 135, which will then relay the request to a capable Local Delegate Appliance 110. The Local Delegate Appliance 110 retrieves a copy of the desired web video from its directly connected Local Delegate Storage 115 and transmits it directly to the End-Consumer Device 100. In delivering the content to the end consumer, the Local Delegate Appliance 110 emulates the Central Service Endpoint such that it appears to any external observer, such as the end consumer, to have originated from the Central Service Endpoint 125 and more specifically from the Service Processing 130 itself.

It can be appreciated from the foregoing that, because of the increased bandwidth and decreased latency between the End-Consumer device 100 and the Local Delegate Appliance, the delivery of the desired web video, when originating from the Local Delegate Appliance 110, is substantially improved over the otherwise identical delivery originating from the Central Service Endpoint 125. It will be appreciated that, in some embodiments or in some instances, the appropriate Local Delegate Appliance 110 may be not be the most physically or topologically proximate, but may be selected based on performance criteria such as latency, increased bandwidth, network congestion, or other network performance conditions.

In some embodiments of the invention, it is desirable to ensure that, as often as possible, services traditionally performed by a Central Service Endpoint 125 are delegated, at least in part, to a Local Delegate Appliance 110. In doing so, the resulting End-consumer experience will be improved while the costs typically associated with deploying Central Service Endpoints 125 on local networks can be avoided. Those skilled in the art will appreciate that the hardware demands of a Local Delegate Appliance 110 should be substantially less than an equivalently positioned Central Service Endpoint 125.

Figure 2:
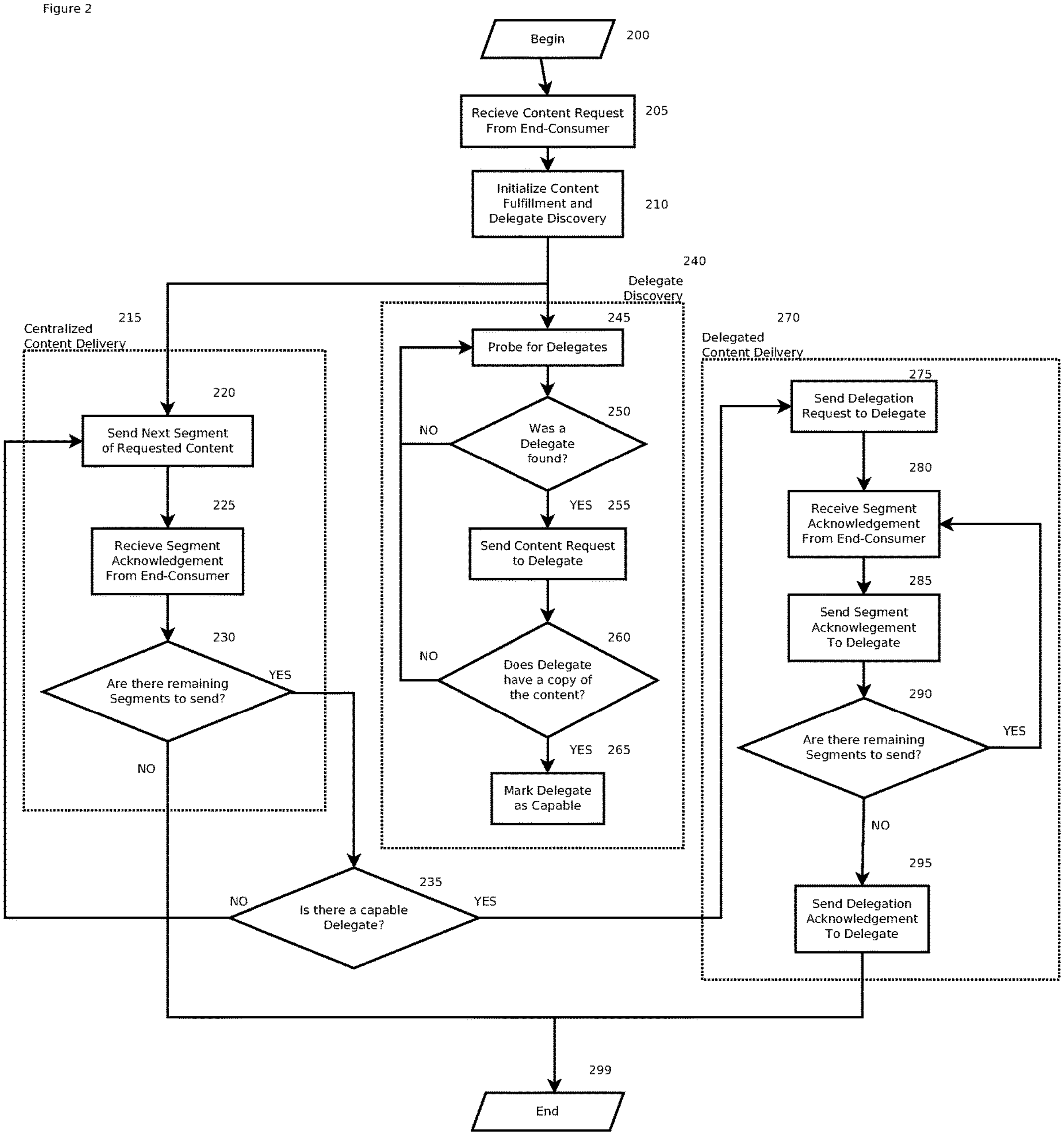
FIG. 2 illustrates an embodiment of a process by which a central service endpoint can delegate content delivery to a local delegate appliance in accordance with the present invention.

FIG. 2 illustrates a process by which an exemplary embodiment of a system in accordance with the invention, in this example a content delivery service, responds to a request from an End-Consumer Device 100. It will be noted by those skilled in the art that this embodiment does not necessarily include a Local Delegate Appliance 125. The process begins at 200 and at 205 the Request from an End-Consumer device 100 is received. At 210 the request is used to initialize two different sub-processes, Centralized Content Delivery 215 and Delegate Discovery 240. In at least some embodiments the processing of Delegate Discovery 215 and Centralized Content Delivery 215 can occur substantially in parallel.

In the Central Content Delivery 215 sub-process, the requested content begins to transmit in segments, as indicated at step 220. Following transmission of each segment, an acknowledgement is received from an End-Consumer Device 100, indicated at 225, before proceeding. In at least some embodiments, multiple segments may be transmitted at 220 and multiple acknowledgements received at 225 in order to provide a more efficient pipelined delivery. Those skilled in the art will note that this is a standard feature of many content streaming protocols, for example TCP. After transmitting segments and receiving acknowledgements, the process will perform a check to see if there remain any segments to transmit, as indicated at step 230. If there exist no more segments for the requested content, the process will terminate at 299. If additional segments are still to be transmitted, the process will check at step 235 to see if the Delegate Discovery 240 sub-process has marked any delegate as capable of continuing the service of this request.

The Delegate Discovery 240 operates by probing for delegates at 245. This probe consists of a specifically crafted transmission from the Delegate Coordinator 135 to a potentially capable Local Delegate Appliance 110. If the probe results in no response at 250, the process will re-issue the probe in an effort to find another capable Local Delegate Appliance 110. If, instead, a Local Delegate Appliance 110 has responded to the probe, the sub-process 240 will send the current content request to the responding Local Delegate Appliance 110, at shown at step 255. If, due to a response from the forwarded request, it is determined at 260 that the Local Delegate Appliance 110 has a copy of the content stored in its Local Delegate Storage 115, then the Local Delegate Appliance 110 is marked at step 265 as capable of continuing the service of this request on behalf of the Central Service Endpoint 125.

If at 235, it is discovered that a capable Local Delegate Appliance 110 exists that can service the request on behalf of the Central Service Endpoint 125, the process sends a Delegation Request at 275 to the Local Delegate Appliance 110 as part of a Delegated Content Delivery sub-process, indicated at 270. The Central Service Endpoint 125 continues to receive segment transmission acknowledgements at 280 and, in turn, forwards those to the Local Delegate Appliance 110 at 285. Those skilled in the art will appreciate that transmissions issued by the Local Delegate Appliance 110 appear to an observer as if they originated from the Central Service Endpoint 125, and will trigger acknowledgements to be transmitted to the Central Service Endpoint 125 instead of the actual producer, the Local Delegate Appliance. It can be further appreciated that this method allows the Central Service Endpoint 125 to, at all times, maintain the status and tracking of a service. In a manner essentially identical to that described in the Centralized Content Delivery sub-process, the Delegated Content Delivery sub-process continues until it is determined at 290 that there exist no more segments to transmit and the process terminates at 299.

Figure 3:
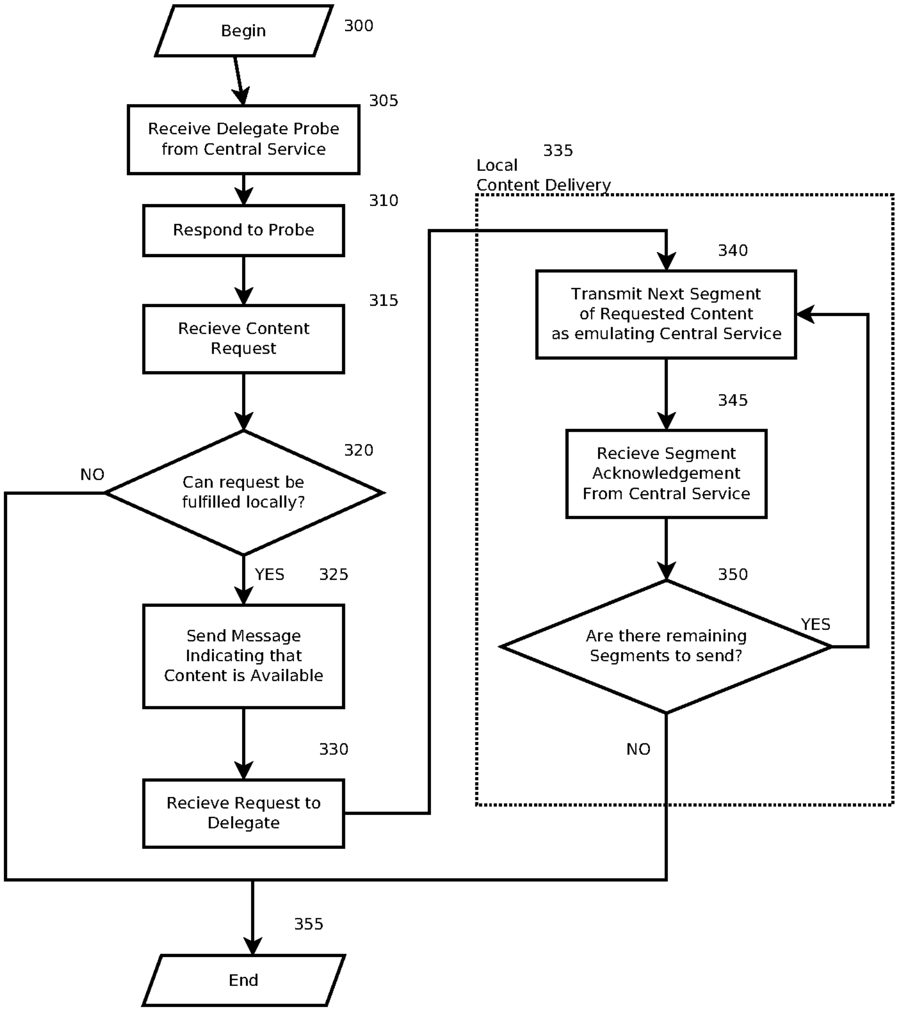
FIG. 3 illustrates an embodiment of a process by which a local delegate appliance can fulfill content delivery delegated by a central service endpoint in accordance with the present invention.

Referring next to FIG. 3, the process by which a Local Delegate Appliance 110 coordinates with a Central Service Endpoint 125 can be better appreciated, again using a content delivery service as an exemplary embodiment. The process begins at 300, and at 305 a probe originating from a Central Service Endpoint 125, more specifically the Delegate Coordinator 135, is received. This probe, in at least some embodiments, contains metadata necessary for a Local Delegate Appliance 110 to determine if it has the proper capabilities to perform the functions required by the Central Service Endpoint 125. If the Local Delegate Appliance is capable and available it responds to the probe at 310 and awaits further commands.

At 315 a more specific request for service is received from the Central Service Endpoint 125. This request defines the service that the Local Delegate Appliance 110 is to perform on behalf of the Central Service Endpoint 125. For the example of a content delivery service, this request details the exact content to be transmitted and any other metadata regarding how the content should be transmitted. This metadata may include, in at least some embodiments, descriptions of security protocols which must be supported and followed in order to correctly transmit the desired data. If it is determined at step 320 that the Local Delegate Appliance 110 can conform to the request received at step 315, for example by having a stored copy of the requested content in the associated Local Delegate Storage 115 and also being capable of handling the necessary security protocols, then, at step 325, it sends a message to the Central Service Endpoint 125 indicating that it is ready to fulfill the request received at step 315. Otherwise, the process ends at 355 as the Local Delegate Appliance 110 is not useful to the Central Service Endpoint 125 in the context of the current request.

Assuming that a Local Delegate Appliance 110 is capable of fulfilling the current request, it receives a request to delegate content delivery, as indicated at step 330. This request to delegate contains, in at least some embodiments, specific security information necessary to emulate the Central Service Endpoint 125 for a single secure transmission and/or details regarding how much of the desired content the Central Service Endpoint 125 may have already transmitted to the End-consumer Device 100. Those skilled in the art can recognize that such constructs allow the Central Service Endpoint 125 to improve its service to the End-consumer Device 100, by initiating transmission before a capable Local Delegate Appliance 110 is discovered and queried. This can substantially improve the initial response time to a request, while still allowing for a Local Delegate Appliance 110 to overtake a transmission in progress in order to further improve it by utilizing the high bandwidth capacity and low latency of the local network that directly connects it to an End-consumer Device 100.

Once engaged in Local Content Delivery 335, a Local Delegate Appliance 110 begins transmitting segments of the requested data at 340 by emulating the transmission details that the Central Service would include, and effectively impersonating the Central Service. Those skilled in the art will note that this process is similar to Centralized Content Delivery 215 and as such can benefit from the same multi-segment transmission and pipelining. The Local Content Delivery 335 differs substantially from the Centralized Content Delivery 215 at 345, as the Local Delegate Appliance 110 must receive its segment acknowledgements relayed from the Central Service Endpoint 125. As previously discussed in reference to Delegated Content Delivery 270, the End-consumer Device 100 routes its segment acknowledgements to the Central Service Endpoint 125 despite the segments having originated from a Local Delegate Appliance 110 due to the impersonation performed by that appliance.

This process continues until, at 350, it is determined that no more segments remain to be transmitted. When no segments remain, the process ends at 355, having completed the request delegated to it by a Central Service Endpoint 125.

Figure 4:
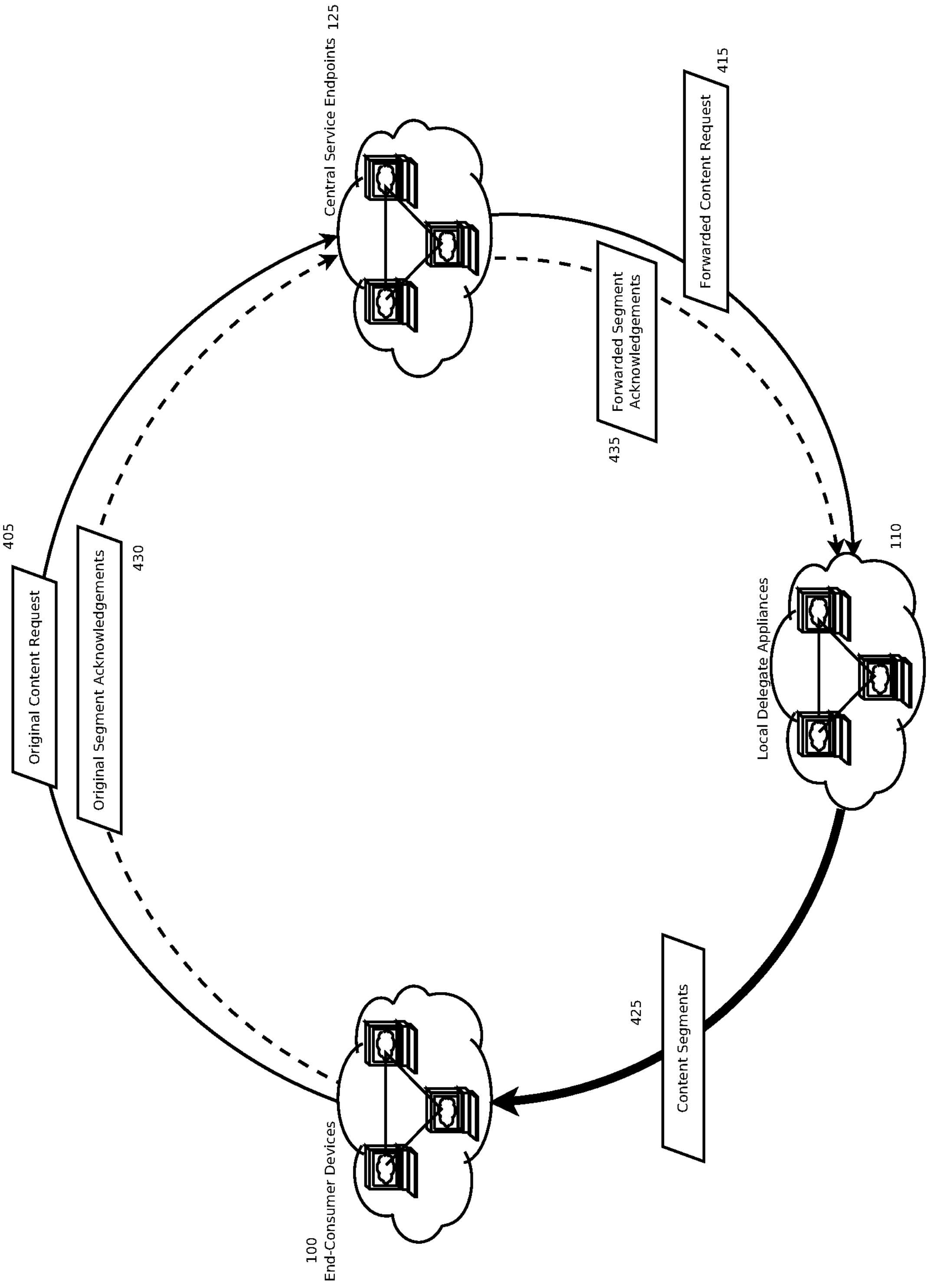
FIG. 4 shows the flow of data and content for a process which provides a content delivery service in accordance with the present invention.

Referring next to FIG. 4, the flow of data during the processes described by Delegated Content Delivery sub-process 270 and Local Content Delivery sub-process 335 can be better appreciated. Original Content Requests 405 are produced by End-consumer Devices 100 in order to solicit the transmission of a specific content object from a Central Service Endpoint 125. As part of the Delegate Discovery Process 240, the Original Content Request 405 is transformed and appended with transmission emulation metadata and transmitted to a Local Delegate Appliance as a Forwarded Content Request 415.

When a Local Delegate Appliance 110 receives this transmission it initiates the transmission of Content Segments 425 to the End-consumer devices, again emulating the characteristics of the Central Service Endpoint. In turn, the End-consumer Devices 100 perceives the transmitted segments as having originated from the Central Service Endpoint 125 and produces Original Segment Acknowledgements 430 destined for the Central Service Endpoint 125. The Central Service Endpoint 125 produces Forwarded Segment Acknowledgements 435 and transmits them directly to the coordinating Local Delegate Appliance 110.

One skilled in the art can appreciate that, in this data flow, the substantially larger transmissions are the Content Segments 425 which only traverse the direct connection form the Local Delegate Appliances 110 to the End-consumer Devices 100. The comparatively small Original Content Request 405 and Original Segment Acknowledgements 430 and their respective forwarded versions demand less from the transmitting networks in terms of bandwidth capacity and latency in order to maintain a high level of service.

Additionally, one skilled in the art can appreciate that at no point during a transmission is the Central Service Endpoint 125 unaware of the status of the transmission. The Central Service Endpoint receives the Original Segment Acknowledgements 430 directly and, as a result, possess the same level of tracking information regarding the resulting data stream as it would in a system where it directly served content segments to the End-consumer Device 100. This affords the Central Service Endpoint, at all times, the ability to rescind its request for delegation to the Local Delegate Appliance 110 and resume direct service of a request or transfer the fulfillment to another Local Delegate Appliance 110. In at least some embodiments, this can occur for purposes of further improving the service, balancing loads across Local Delegate Appliances 110, recovering from failure of a Local Delegate Appliance, or providing uninterrupted service in configurations where End-consumer Device 100 mobility may otherwise disrupt service, etc.

Figure 5:
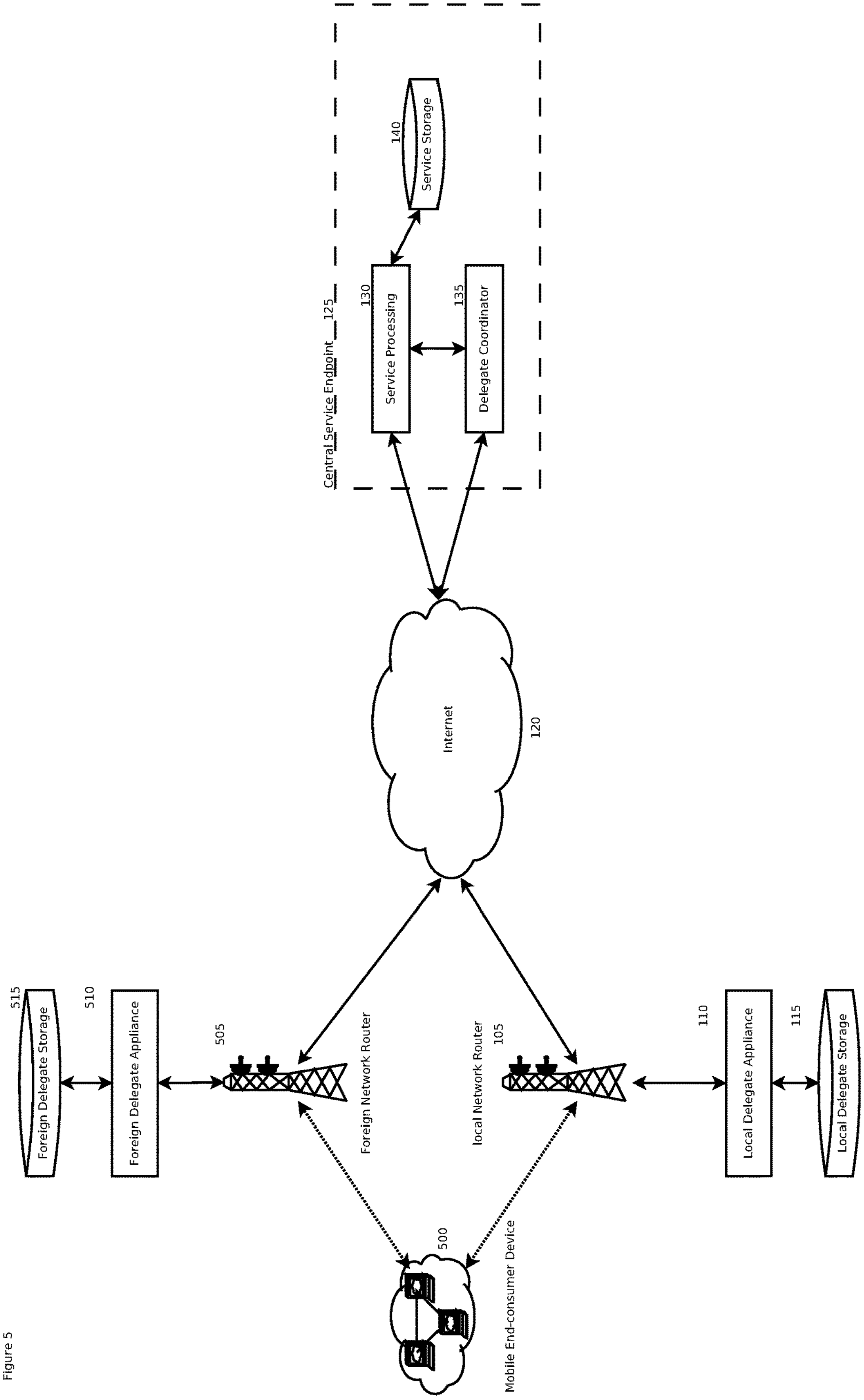
FIG. 5 shows a basic arrangement of an embodiment of a system that can adapt to end-consumer device mobility in accordance with the present invention.

Referring next to FIG. 5, a more robust embodiment of a system in accordance with the present in the invention is illustrated, and, in particular, one in which End-Consumer Device 100 mobility is a consideration. A Mobile End-consumer Device 500 is connected to a Local Network Router 105. In at least some embodiments this connection is provided by a wireless transport technology, for example, 4G-LTE or 801.11n WIFI, and the Local Network Router 105 includes hardware necessary to provide a virtual direct connection over the wireless transport for a locally attached Local Delegate Appliance 110. For the purpose of illustration, the local network is the primary network for a Mobile End-Consumer Device 500 and it services materially all of the data transmission between the Mobile End-Consumer Device 500 and the Internet 120 until an explicit hand-off occurs with another network.

A Foreign Network Router 505 exists which is functionally equivalent to the Local Network Router 105. In at least some embodiments, the local and foreign networks provided by their respective routers are distinguishable to the Mobile End-consumer Device 500 only in terms of which network is presently providing transport of data segments between the Mobile End-consumer Device 500 and the Internet 120. For the purposes of illustration, the foreign network is the network a Mobile End-consumer Device 500 intends to migrate to during a hand-off and in doing so it will cease to receive data segments over the local network and will begin receiving data segments over the foreign network. The Foreign Network Router 505 also possesses a directly-connected Foreign Delegate Appliance 510 and in turn, in at least some embodiments, the Foreign Delegate Appliance 510 has directly attached Foreign Delegate Storage 515.

In such an arrangement, the local and foreign networks exist to provide seamless transport to and from the Internet 120, and as a result Central Service Endpoints 125, in a manner which is perceived as seamless by the Mobile End-consumer Device 500. It can be appreciated by those skilled in the art that the topology of a network designed to deal with device mobility is fundamentally different than that of a static network. Particularly, whereas an End-consumer Device 100 may be able to directly connect to a Local Delegate Appliance 110 in a static network topology due to their status as peers on a network, in a mobile network the Local Delegate will be connected at a level below the seamless transport to and from the internet. It can therefore be appreciated that, in embodiments where end-consumer device mobility is a concern, the Local Delegate Appliance 110 will require additional functionality to impersonate a Central Service Endpoint 125 which allows it to emulate not only the transmission over the top of the seamless transport layer, but also the particular format which provides the seamless transport layer itself.

One skilled in the art, can also appreciate that while the Local Delegate Appliance 110 and Foreign Delegate Appliance 510 are mobile with respect to a Mobile End-consumer device 500 as it traverses its mobile network, they are directly attached to static infrastructure and therefore from the point of view of a Central Service Endpoint 125, are directly accessible without any special methods or systems. This allows a single Central Service Endpoint 125 the ability to manage several Local and Foreign Delegate Appliances in concert to provide seamless delegated services as Mobile End-Consumer Devices 500 migrate across a mobile network.

In at least some embodiments, when a Mobile End-consumer device 500 completes a hand-off and no longer receives its data transmissions from the local network, the Local Delegate Appliance associated with that local network will lose the ability to fulfill a delegated service request. For example, it will be unable transmit Content Segments 425 to the Mobile End-consumer Device 500. As discussed hereinabove, the Central Service Endpoint 125 maintains, at all times, the status of the service fulfillment, for example the list of received Original Segment Acknowledgements 430, as an artifact of the system present in the invention. In the event that a Local Delegate Appliance 110 has failed to deliver Content Segments 425, the Central Service Endpoint 125 will no longer receive Original Segment Acknowledgements 430 and can, as a result, identify that the service is potentially being interrupted. Utilizing the tracking information it has collected the Central Service Endpoint 125 will be able to resume direct service of the request, for example by transmitting data segments directly, or by re-delegating the service to the more appropriate Foreign Delegate Appliance 510, provided that the Appliance 510 is capable of fulfillment. As with the local appliance, the Foreign Delegate Appliance is capable of fulfilling the delegation request when a copy of the requested content exists in the Foreign Delegate Storage 515, and the Foreign Delegate Appliance can handle any necessary security protocols.

Figure 6:
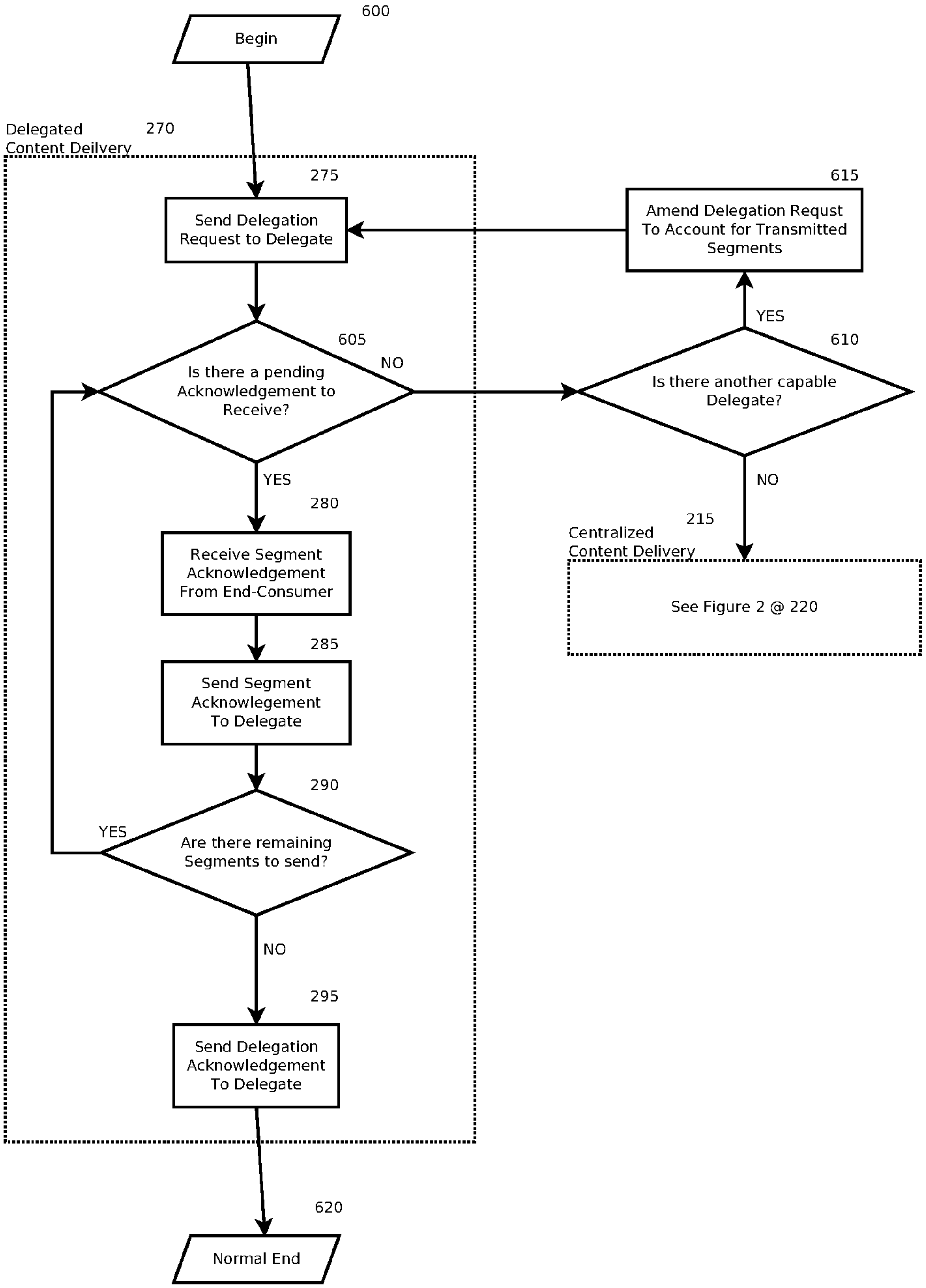
FIG. 6 illustrates a process in accordance with the present invention by which a central service endpoint can migrate delegation of a service from one local delegate appliance to another.

The process by which this migration is resolved can be appreciated through FIG. 6, which presents a more robust illustration of the sub-process of FIG. 2 that performs Delegated Content Delivery 270 and adds support for seamless service across network conditions such as End-consumer device mobility. The process of FIG. 6 begins at 600 which, for the purposes of illustration, can be directly associated with FIG. 2 at 235 when taking the path labeled “YES”. As in FIG. 2, the Central Service Endpoint 125 sends a delegation request to its current capable Local Delegate Appliance 110 at 275. Immediately after, and periodically during the remainder of Delegated Content Delivery 270, the process performs a test to determine if there are pending segment acknowledgements to receive as shown at 605.

In at least some embodiments, the determination depends upon the previous frequency of received segment acknowledgements and various time-based metrics related to the desired quality of service. For example, if the frequency at which Original Segment Acknowledgements 430 are transmitted from an End-consumer Device 100 has decreased significantly or become irregular, the process may choose to determine that no pending acknowledgements exist in order to improve quality of service. In the case of a Mobile End-consumer Device 500, the Original Segment Acknowledgements 430 will temporarily stall as the Content Segments 425 will no longer be able to reach the Mobile End-consumer Device 500.

Once the process has determined that the current Local Delegate Appliance 110 is no longer adequately performing the requested service, in this example delivering the requested content, it will either modify the existing request for delegation to reflect the current status of the service at 615, in this example how much of the requested content was delivered, or it will fall back to Centralized Content Delivery 215 as presented in FIG. 2 at 220. This determination is made based on whether the ongoing Delegate Discovery 240 process has identified another capable delegate which is immediately ready to take over the delegated service, as shown at step 610. If such a delegate exists, such as the Foreign Delegate Appliance 510, then the amended request for delegation will be transmitted at 275 and the more robust example of Delegated Content Delivery 270 will process again until there are no remaining segments at 290 and the delegated service is decommissioned at 295.

Correlating the processes of FIG. 2 with the more robust process presented in FIG. 6, one skilled in the art can appreciate that the decision at 610 is not the only path which recovers the beneficial Delegated Content Delivery 270 in the event of a device failure of the migration of a Mobile End-consumer device 500. Through the coordination of an present and ongoing Delegate Discovery 240 process, the fall back path through Centralized Content Delivery 215 can, when presented with a newly discovered and capable delegate, re-engage Delegated Content Delivery 270 at 235 by taking the path labeled “YES”.

Furthermore, one skilled in the art can appreciate that this combined process allows for any permutation of local and foreign networks to be traversed by a Mobile End-consumer Device 500 over the lifetime of an applicable service, such as streaming longer web video content. When Local Delegate Appliances 110 exist on a network that a Mobile End-consumer Device 500 joins and/or leaves, the Central Service Endpoint 125 will be capable of real-time detection and seamless engagement and disengagement of these Local Delegate Appliances 110 for the purpose of transparently improving the service to the customer.

Figure 7:
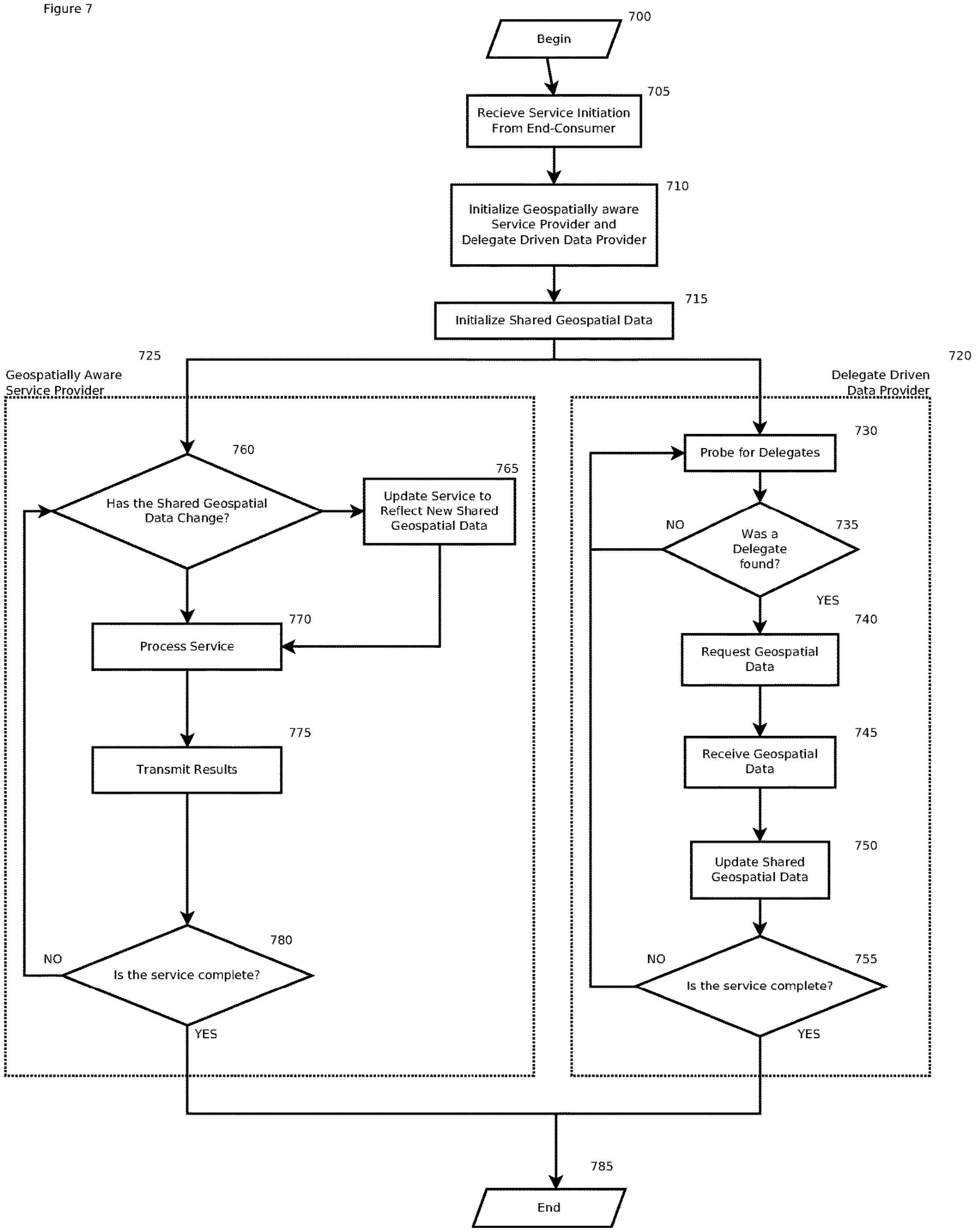
FIG. 7 illustrates an embodiment of a process for providing a service or application real-time geospatial data for an end-consumer in accordance with the present invention.

Referring next to FIG. 7, a process by which an exemplary embodiment of the system present in the invention, a service which benefits from real-time geospatial data, responds to a request from a Mobile End-Consumer Device 500 can be better appreciated. This service is unique from the previous example as at no point does a Local Delegate Appliance 110 need to make a direct or indirect connection with the Mobile End-Consumer Device 500. Instead, the Central Service Endpoint 125 is enabled by having a real-time stream of data from various Local Delegate Appliances 110 in order to better achieve the desired service, for example the service of advertising based on the Mobile End-Consumer Device's 500 approximate location or the manipulation of content based on network conditions between the Mobile End-Consumer Device 500 and the Central Service Endpoint 125 made obvious by various Local Delegate Appliances 110 along the transmission path.

The process begins at 700 and receives the initial service initiation request from a Mobile End-Consumer Device 500 at 705. This triggers the initialization of two sub-processes which, in at least some embodiments, can occur substantially in parallel, the Geospatially Aware Service Provider sub-process 725 and the Delegate Driven Data Provider sub-process 720. In at least some embodiments, the Geospatially Aware Service Provider sub-process 725 is performed primarily by Service Processing 130 and the Delegate Driven Data Provider sub-process is performed primarily by the Delegate Coordinator 135. In addition, a Shared Geospatial Data store is initialized to a base value at 715. In at least some embodiments, this store is initialized to a value which would allow the service to proceed regardless of whether it ever changes.

Examining first the Delegate Driven Data Process 720, one skilled in the art will note the similarities with the previously discussed as a part of FIG. 2 as the Delegate Discovery 240. In this embodiment, the purpose is not to discover a Local Delegate Appliance 110 capable of fully providing the service, instead the derivation and distillation of geospatial data is delegated to a Local Delegate Appliance 110 which has a unique advantage for observing and analyzing the data.

As in FIG. 2, a probe is sent out from the Central Service Endpoint 125 at 730 and if a delegate has not responded at 735 the process circles back and resends a probe. Once a delegate is found a request for certain geospatial data is transmitted to the Local Delegate Appliance 110 at 740 and a response is received at 745. The contents of this geospatial data, in at least some embodiments, can include some or all of the following: information such as the geographical location of the Local Delegate Appliance 110 itself, historical recordings of network conditions that may affect bandwidth capacity and latency at this point in the network, historical recordings of Mobile End-consumer Device 500 demographic information, explicitly generated metadata sent by the Central Service Endpoint 125 to be stored at this Local Delegate Appliance 110, etc. The contents of this response are then placed in the shared geospatial data store at 750. Until it is determined that the service is complete at 755, the process repeats itself continually updating the shared geospatial store with real-time data.

Examining the Geospatially Aware Service Provider 725, it can be appreciated how the real-time shared geospatial data updates are utilized to affect the service. The service periodically checks at 760 for updates to the geospatial data on which the service is based. As the Delegate Driven Data Provider 720 updates this data it is incorporated at 765. The service then processes some or all of its desired functions at 770 and transmit results tailored by the shared geospatial data at 775. If the service is not completed at 780, processing can resume by checking again for changes to the shared geospatial data at 760 and repeating all processing steps therefore. Alternatively, once the service and Delegate Driven Data Provider 720 determine that the service is complete, the process terminates normally at 785.

One skilled in the art can appreciate that this embodiment utilizes the systems of the present invention to enable out-of-band real-time data collection and analysis which is not only tolerant to end consumer mobility but can also adapt and derive more informative data from a mobile-enabled network topology. It can be further appreciated, that embodiments of this nature may benefit from the coordination of a plurality of Local Delegate Appliances 110 to derive a more complete view of the end-to-end transit layer and the conditions thereof enabling services to dynamically adapt to a multitude of network conditions seamlessly.

Figure 8:
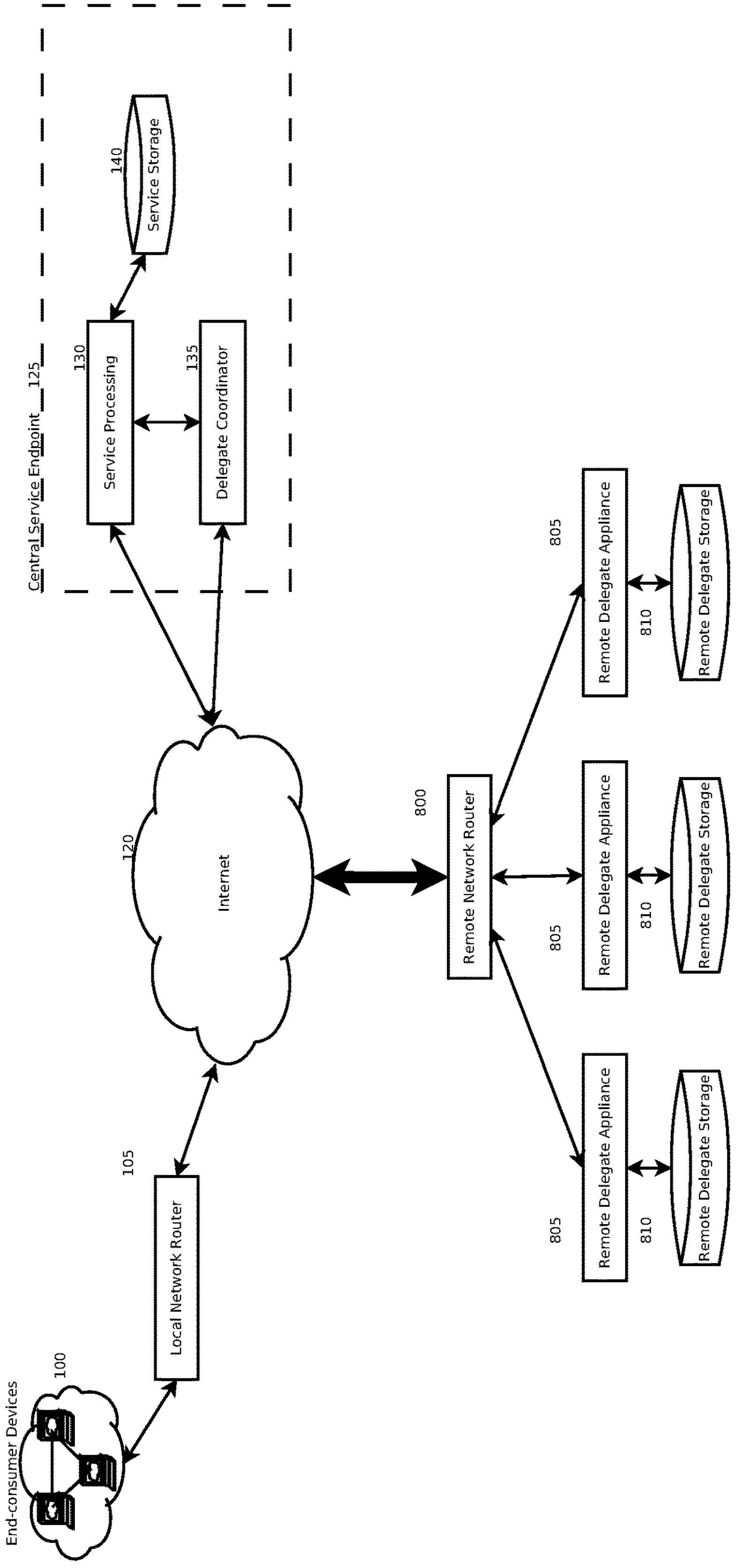
FIG. 8 shows an arrangement of the system for practicing an embodiment of an alternative method in accordance with the present invention.

Finally referring to FIG. 8, an arrangement of the present invention which can be used to further augment service delivery can be appreciated. This arrangement is unique to the arrangements presented in FIGS. 1 and 5 in that it utilizes the delegated services platform to achieve reduced costs associated with hosting a Central Service Endpoint 125, while remaining transparent to an End-consumer device 100. For the purposes of illustration, the description will assume the service of a Content Delivery Network. More particularly, a content delivery service where costs associated with Service Processing 130 are at a minimum when hosted on a particular network while costs associated with bandwidth capacity are at a minimum when hosted on one or more remote networks.

Differing from the arrangements present in FIG. 1 and FIG. 5, the Remote Delegate Appliances 805 are not necessarily directly connected to either the Local Network Router 105 or the Central Service Endpoint 125. They are instead directly connected to a Remote Network Router 800 where, in at least some embodiments, the cost of hosting the necessary equipment and providing the necessary bandwidth capacity is cheapest. As in previously illustrated arrangements, each Remote Delegate Appliance 805 has a directly attached Remote Delegate Storage 810 capable of storing content relevant to the services to be delegated to it.

The process by which an arrangement such as the one present in FIG. 8 is materially identical to the content delivery process outlined in FIG. 2 and FIG. 3. Whereas the original arrangement for those figures sought to benefit the content delivery service by way of utilizing a high bandwidth capacity and low latency local network to improve the service, the arrangement as presented in FIG. 8 is intended to reduce the cost of the service while maintaining equivalent or better quality of service to the end-consumer.

It can also be appreciated by one skilled in the art, that an arrangement like this can also be used to minimize cost by allowing an extreme load to be balanced across a plurality of commodity delegates instead of an exponentially more expensive single service endpoint. It then follows that while FIG. 8 illustrates Remote Delegate Appliances 805 attached to a Remote Network Router 800, the delegates can exist on the same network as the Central Service Endpoint 125 in an effort to reduce the cost of that component while achieving the same result through a load balancing solution that allows the Central Service Endpoint 125 and a plurality of Remote Delegate Appliances 805 to transmit data over the same link to the internet, appearing to all observers outside of the service's internal network to be a consolidated single service endpoint.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A method of adapting delegated content processing and delivery to a mobile end user device in emerging conditions comprising:

receiving at a central service endpoint from a mobile end user device a request for service requiring a response to the end user device, issuing a probe to one or more delegate appliances of a plurality of delegate appliances to identify a delegate appliance capable of providing at least a segment of the response to the end user device;

delegating to a delegate appliance that responds to the probe the task of delivering one or more segments of the response to the end user device that have not been already transmitted to the end user by the central station endpoint, the delegate appliance configured to emulate the transmission details of the central service endpoint such that the end user device perceives each of the one or more segments of the response as originating from the central service endpoint, receiving from the end user device at the central service endpoint an acknowledgement of each of the one or more segments of the response successfully received by the end user device;

analyzing over time, at the central service endpoint, the acknowledgements from the end user device to enable the central station endpoint to maintain the status and tracking of the service;

determining at the central service endpoint, when a previously selected delegate appliance is no longer successfully transmitting segments of the response to the end user device;

in the event a delegation to a delegate appliance has not yet been made or the previously delegated delegate appliance is unable to continue transmitting one or more segments of the response, transmitting from the central service endpoint to the end user device one or more segments of the response associated with the request for seamless service;

when the previously selected delegate appliance is no longer successfully transmitting segments of the response to the end user, selecting from the remainder of the plurality of processing appliances available to the central service endpoint, in accordance with a network performance criteria, at least one more optimal delegate appliances to act as a delegate for continuing transmission to the end user device one or more segments of the response;

transmitting from the central service endpoint to the newly selected delegate, metadata describing the request, the central service endpoint and the progress of the transmission of the response.

2. The method of claim 1 wherein a more optimal processing appliance is available due to a change in content availability.

3. The method of claim 1 wherein a more optimal processing appliance is available due to device capacity or failure.

4. The method of claim 1 wherein a more optimal processing appliance is available due to a mobile end user device migration.

5. The method of claim 1 wherein a more optimal processing appliance is available due to network congestion.

* * * * *